United States Patent [19]

Naruse et al.

[11] 3,925,603

[45] Dec. 9, 1975

[54] APPARATUS FOR RECORDING AND/OR REPRODUCING INFORMATION SIGNALS HAVING AUTOMATIC FOCUSING

[75] Inventors: Yosuke Naruse; Taisuke Yoshioka; Masami Himuro; Keiichi Ito, all of Tokyo, Japan

[73] Assignee: Sony Corporation, Tokyo, Japan

[22] Filed: June 3, 1974

[21] Appl. No.: 476,153

[30] Foreign Application Priority Data

June 11, 1973 Japan .............................. 48-65663

[52] U.S. Cl...... 178/6.6 R; 178/6.7 A; 179/100.3 V; 250/201

[51] Int. Cl.$^2$........................ H04N 5/76; G11B 7/12

[58] Field of Search....... 178/6.6 R, 6.7 A, DIG. 29; 179/100.3 G, 100.3 V, 100.4 R, 100.41 L; 250/201, 202, 203 R, 204, 550, 206, 555, 216, 566; 340/570, 173 LM; 353/107; 352/140; 355/44–45, 55–56; 354/25; 356/3–4

[56] References Cited

UNITED STATES PATENTS

| | | | |
|---|---|---|---|
| 3,596,101 | 7/1971 | Someya | 250/204 |
| 3,635,551 | 1/1972 | Szymber | 353/101 |
| 3,833,769 | 9/1974 | Compaan et al. | 179/100.3 V |
| 3,876,841 | 4/1975 | Kramer et al. | 179/100.3 V |

OTHER PUBLICATIONS

IBM Tech. Disc. Bulletin, Vol. 15, No. 2, 7/72 pp. 504–505.

*Primary Examiner*—Raymond F. Cardillo, Jr.
*Attorney, Agent, or Firm*—Lewis H. Eslinger; Alvin Sinderbrand

[57] ABSTRACT

An apparatus for recording and/or reproducing information signals is disclosed in which a light beam is substantially forcussed on the mirror surface of a recording medium, the information signals are recorded on said recording medium with said light beam, and the recorded information signals are reproduced with said light beam. The apparatus comprises an optical detecting device for detecting the light beam reflected on the recording medium at least two different positions and a control device for controlling the focus of said light beam in accordance with the output signal from the optical detecting device.

2 Claims, 9 Drawing Figures

APPARATUS FOR RECORDING AND/OR REPRODUCING INFORMATION SIGNALS HAVING AUTOMATIC FOCUSING

BACKGROUND OF THE INVENTION

1. Field of the Invention

The present invention relates generally to an apparatus for recording and/or reproducing information signals on and/or from a recording medium optically, and is directed more particularly to an apparatus for optically recording and/or reproducing information signals on and/or from a disc-shaped recording medium wherein a beam light is automatically focused on the disc-shaped recording medium during recording and/or reproducing of the information signals.

2. Description of the Prior Art

Up to now, there has been proposed an apparatus in which, as shown in FIG. 1, information signals such as television signals (TV-signal) are recorded on a spiral track 2 formed on a mirror surface 1a of a disc 1 as a pitted row 3. With such an apparatus, the TV-signal is recorded as variations of a length $l$ of one pit of the pitted row 3 and a distance $d$ between adjacent pits.

Upon reproduction, a laser light beam is radiated on the track 2 and the reflected laser beam on the pits 3, which is intermittent, is detected as the TV-signal. However, the disc 1 is essentially a stiff body due to its mirror surface 1*a*, so that a fluctuation may occur in the surface 1*a* of the disc 1 due to vibrations and variation of the flatness of the disc 1 to cause the impinging laser beam to be out of focus on the disc surface. Hence, a noise may appear in the reproduced signal due to the reflected laser beam which is out of focus on the disc 1, which requires automatic focussing or focusadjusting to eliminate the noise.

SUMMARY OF THE INVENTION

It is an object of the present invention to provide an apparatus for optical recording and/or reproducing information signals in which focus adjustment can be easily carried out.

It is another object of the invention to provide an apparatus for optically recording and/or reproducing information signals in which focus adjustment can be automatically achieved.

The other and additional objects, features and advantages of the invention will become apparent from the following description taken in conjunction with the accompanying drawings.

DESCRIPTION OF THE PREFERRED EMBODIMENTS

Figure 2A:
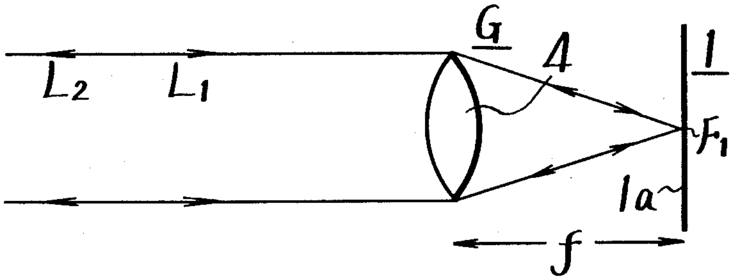
FIGS. 2A to 2C, inclusive, are schematic diagrams showing incident light and reflected light, respectively, which are used for explaining the present invention.

First of all, the theory of the present invention will be now described with reference to FIG. 2. In the figure, if a parallel light or light beam $L_1$ is projected to a convex lens or focussing lens 4 and a total reflection plate, such as the mirror surface 1a of the disc 1 with which this invention finds ready application, is located on the focal, plane including the focus point, $F_1$, of the lens 4 perpendicular to the parallel light $L_1$, a reflected light beam $L_2$ on the mirror surface 1a becomes a reverse parallel light beam after passing through the lens 4 as shown in FIG. 2A. In this case, if the focal length of the focussing lens 4 is taken as $f$ and the mirror surface 1a is located at the position of $f + \alpha$ or somewhat farther from the lens 4 as compared with that shown in FIG. 2A, a reflected light on the mirror surface 1a of the disc 1 can be considered as being radiated from an imaginary light source $F_2$ formed at the back of the mirror surface 1a with respect to the lens 4, and one portion the reflected light passes through the lens 4 as a focussing light $L_3$, but the remaining portion of light from the imaginary light source $F_2$ can not pass through the lens 4, as shown in FIG. 2B.

Figure 2B:
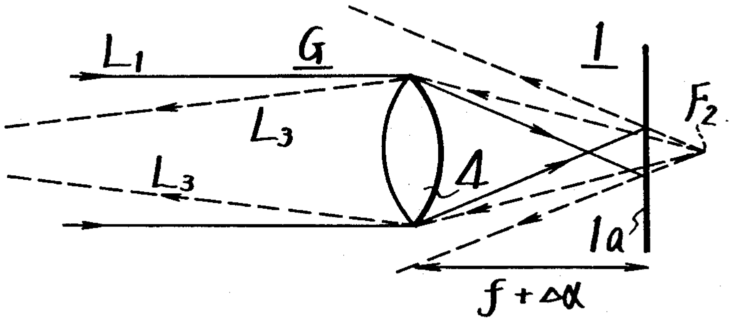
Figure 2C:
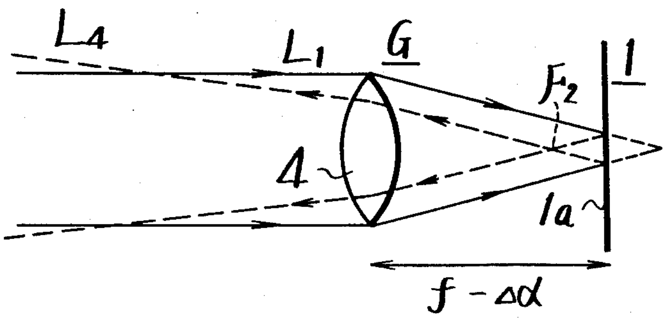

Contrary to the case shown in FIG. 2B, if the mirror surface 1*a* of the disc 1 is located at the position of $f - \Delta\alpha$ or close to the lens 4 as compared with that shown in FIG. *2A*, the imaginary light source $F_2$ is formed at a position between the mirror surface 1*a* and the lens 4, and hence reflected light from the mirror surface 1*a* is radiated from the imaginary light source $F_2$ and becomes diverged light $L_4$ after passing through the lens 4 as shown in FIG. 2C.

Accordingly, if the reflected light is detected at two different positions, a difference may occur in luminous intensity in unit area. As a result, the effect of fluctuations in the position of the mirror surface 1*a* of the disc 1 can be controlled by a signal based upon the difference between the different positions.

Figure 3:
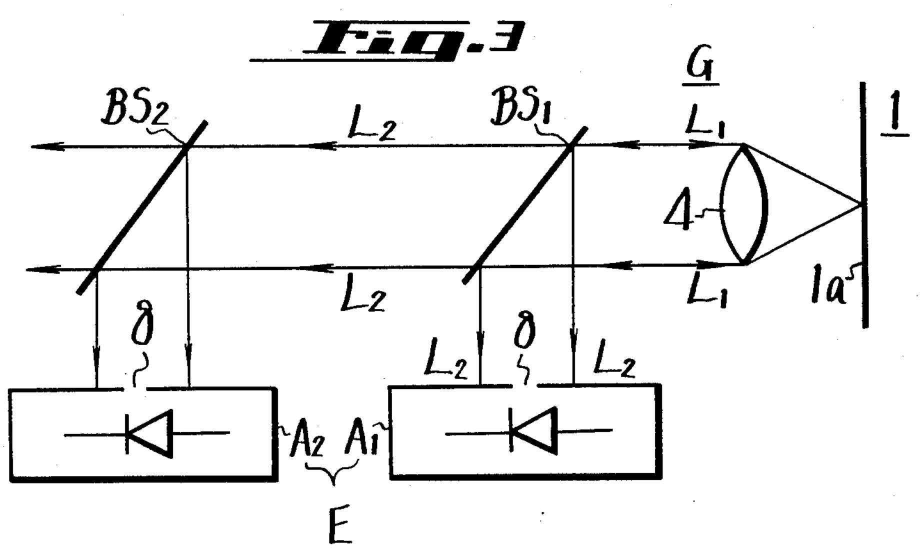
FIG. 3 is a schematic diagram used for explaining the theory of the present invention.

FIG. 3 shows a construction which may be used to practise the above signal control. In the construction of FIG. 3, a pair of beam splitters BS1 and BS2, through which may partially pass the parallel incident and reflected light beams $L_1$ and $L_2$, respectively, and which may partially reflect the light beams from the front and back surfaces thereof, are located in the path of the parallel light beams $L_1$ and $L_2$ in parallel with each other at different positions. The reflected light $L_2$ which is reflected by the splitters BS1 and BS2, respectively, is received by photo-sensors $A_1$ and $A_2$ after passing through slits 8 of the same width. These photo-sensors $A_1$ and $A_2$, which may be photo-diodes, form a detecting device E adapted to detect the luminous intensity of reflected light. With such an arrangement, if the output signals from the respective photo-sensors $A_1$ and $A_2$ are compared, it can be discriminated whether the focus of the lens 4 is on the mirror surface 1a or not. If the reflected light which passes through the lens 4 is the parallel light $L_2$, properly focussed as shown in FIG. 2A, the output signal from the photo-sensor $A_1$ is equal to that from the other photo-sensor $A_2$ in intensity. But if the reflected light which passes through the lens 4 is the converging light $L_3$ as shown in FIG. 2B, the output signal from the photo-sensor $A_1$ is greater than that from the photo-sensor $A_2$ in intensity. Also, if the reflected light which passes through the lens 4 is the diverging light $L_4$ as shown in FIG. 2C, the output signal from the photo-sensor $A_1$ is smaller than that from the photo-sensor $A_2$ in intensity.

The invention is to discriminate the focus of the lens 4 with the detection of differences between the outputs from the photo-sensors $A_1$ and $A_2$ and to adjust the position of the lens 4 so as to maintain the focus of the lens 4 on the track 2 formed on the mirror surface 1a of the disc 1 irrespective of the fluctuation of the disc 1. In this case, it may be considered that the outputs from the photo-sensors $A_1$ and $A_2$ are affected by light loss in the beam splitters BS1 and BS2 and the ununiformity of the widths of the slits 8. However, the affects due to these influences can be accounted for and thus cancelled by, for example, adjusting the sensitivity of the photosensors $A_1$ and $A_2$ and the gain of amplifiers coupled thereto.

Figure 1:
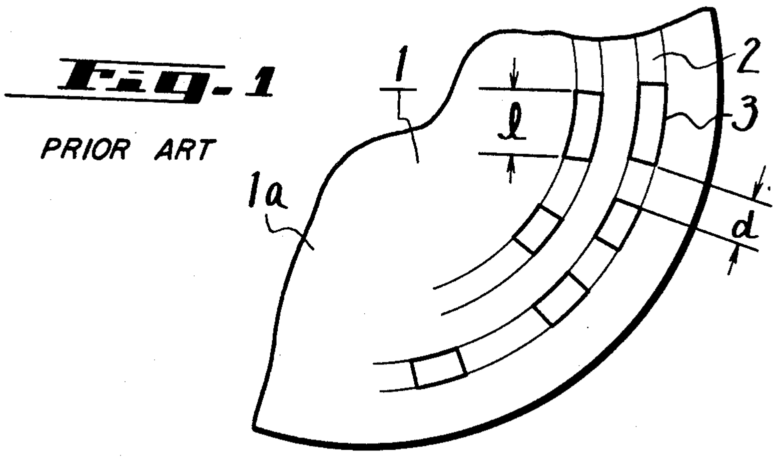
Fig.-1 PRIOR ART
FIG. 1 is a partial plane view of a recording disc to which the present invention is applied.
Figure 4:
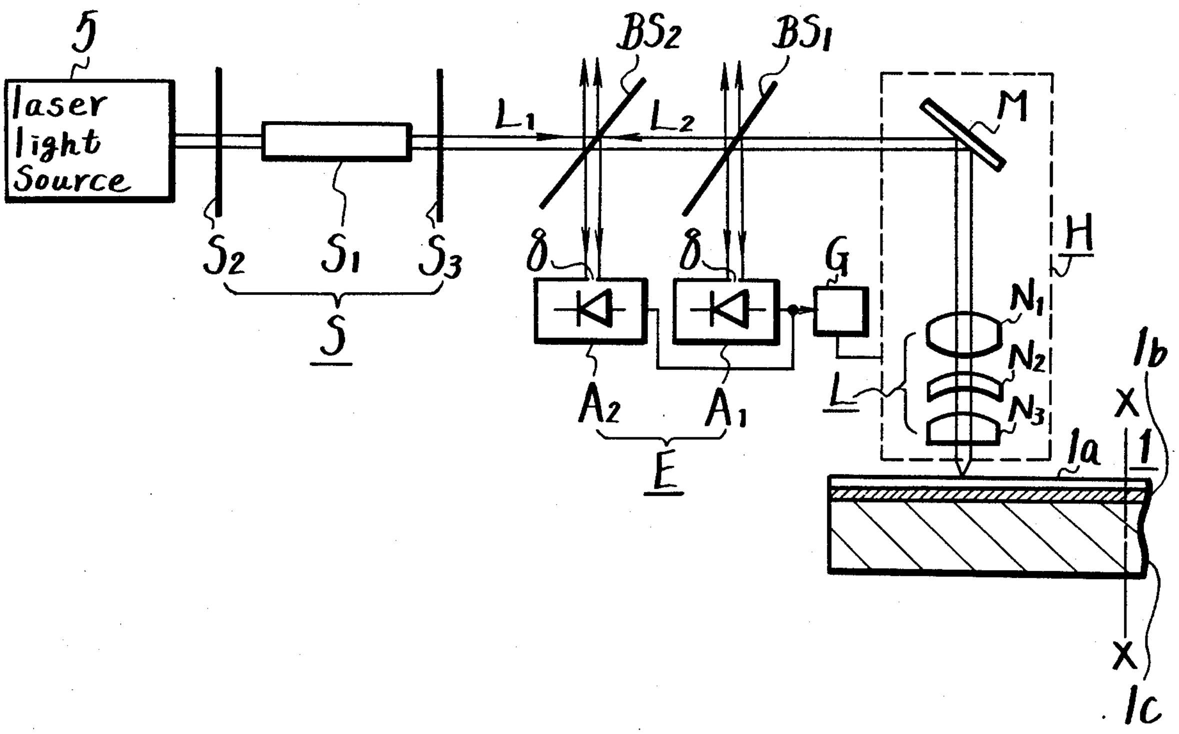
FIG. 4 is a schematic plane diagram showing an embodiment of the apparatus according to the present invention.

An embodiment of this invention will be now described with reference to FIG. 4 in which the same reference numerals as those used in FIGS. 1 to 3 designate the same elements. The apparatus shown in FIG. 4 is also used during a recording operation when informaton signals are recorded. The disc or master disc 1 is formed of a glass plate *1c*, an aluminium layer *1b* coated on the glass plate *1c* with a thickness of about several hundred angstroms (A) and a photo-resist layer with a thickness of about several thousands A (which is the mirror surface *1a*) formed on the aluminium layer *1b*. The disc 1 is rotated by a player (not shown) with the mirror surface *1a* being faced upward about an axis X—X. A tracking head assembly H is arranged in opposed relation to the mirror surface *1a* of the disc 1. The tracking head assembly H is moved along the radial direction of the disc 1 as the disc 1 is rotated. The tracking head assembly H consists of a mirror M and a focussing lens group L which consists of a movable lens $N_1$, a fixed lens $N_2$ and another fixed lens $N_3$ arranged in collimating configuration in the direction facing the disc 1 in this order.

The incident light $L_1$ is radiated from a laser light source 5 such as, for example, an argon-neon tube, as a parallel incident laser light. The incident laser light $L_1$ is reflected by the mirror M in a perpendicular direction and then is substantially focused at one point $F_1$ on the track 2 by the focussing lens group L. In other words, the head assembly H including the mirror M and the lens group is selected in relative position to the disc 1 to form the focus $F_1$ on the track 2, as shown in FIG. 4. The light reflected from the mirror surface 1a passes through the focusing lens group L and then is reflected by the mirror M reversely to the incident light $L_1$ and propagates as the parallel light $L_2$. The reflected parallel light $L_2$ is partially reflected by the beam splitters BS1 and BS2 located in the light path between the mirror M and the laser light source 5 in a direction perpendicular to the direction of propagation of the light $L_2$, respectively. The respective light beams reflected by the splitters BS1 and BS2 are received by the photosensors forming the detecting device E, respectively.

Since the apparatus shown in FIG. 4 may be used as a recording apparatus, a modulation device S is provided in the light path between the beam splitter BS2 and the laser light source 5 for modulating the laser light emitted from the light source 5. An embodiment of the modulating device S may comprise a modulator $S_1$ and a pair of deflecting plates $S_2$ and $S_3$ gripping the modulator $S_1$, the deflection systems of which are arranged at right angles with one another.

With such an arrangement, if any fluctuation appears in the disc 1, the reflected light $L_2$ on the surface *1a* of the disc 1 is converged or diverged because the focus of the lens group L is constant with respect to the track 2 of the disc 1, but the relative position of the disc 1 is fluctuated. Therefore, the outputs derived from the photo-sensors $A_1$ and $A_2$ become different, respectively. Accordingly, if a control device G, which may move the movable lens $N_1$ automatically, is provided and the control device G is driven by the difference in the output signals produced by the photosensors $A_1$ and $A_2$, the distance between the movable lens $N_1$ and the disc 1 can be kept constant. An embodiment of the control device G may comprise a movable coil, for example the voice coil of a speaker, to support the movable lens $N_1$ and the movable coil is driven by the detected difference photo-sensor output signals. In this case, it may be possible that alternatively, the lens $N_1$ is fixed, but the tracking head assembly H except the lens $N_1$ is arranged to be movable to achieve the same effect.

When the above embodiment of this invention is used for reproducing the information signals, the disc 1 consists of a plate *1c* made of vinyl chloride sheet, an aluminium layer *1b* vapor-deposited on the plate *1c* and the mirror surface *1a* formed on the aluminium layer *1b*, and the modulation device S is omitted. With this reproducing apparatus, the light $L_1$ emitted from the light source 5 passes through the beam splitters BS2 and BS1, is changed in direction by the mirror M, and is focussed on the surface *1a* of the disc 1 by the lens group L. The reflected light $L_2$ from the surface *1a* of the disc 1 passes reversely to the incident light $L_1$, is partially reflected by the beam splitters BS1 and BS2, respectively, and then is detected by the detecting device E. In this case, since the reflected light $L_2$ contains the information signals recorded on the surface *1a* of the disc 1, the recorded information signal can be read out from the output signal derived from the detecting device E alternatively, another set formed of a beam splitter and a photo-sensor may be provided for recovering reproduced information signals.

With the above apparatus, the recorded and reproduced signals are preferably subjected to pulse-modulation, so that the reflected light on the disc 1 is intermittent. Accordingly, it may be considered that its control is intermittent. However, upon recording a video signal on the disc 1, its frequency is from several MHz to 10MHz and the rotation frequency of the disc 1 is 30Hz (the rotation speed is 1800 r.p.m.), so that even if a fluctuation of the disc 1 with a frequency of 30 times that of the disc 1 is taken into account, the frequency of the fluctuation is at most 1KHz. As a result, even if the reflected light is modulated, any problem can be eliminated by differentiating the output signal from the detecting device E with a time constant of about 1 microsecond. Therefore, an inexpensive photosensor which might not have superior frequency characteristics can be used.

Figure 6A:
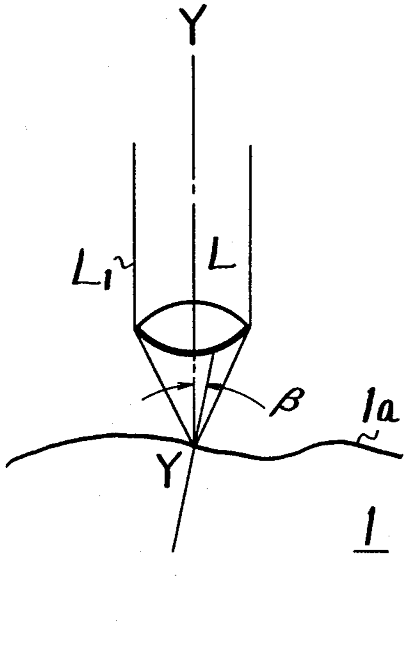
FIGS. 6A and 6B are, respectively, diagrams used for explaining other conditions.
Figure 6B:
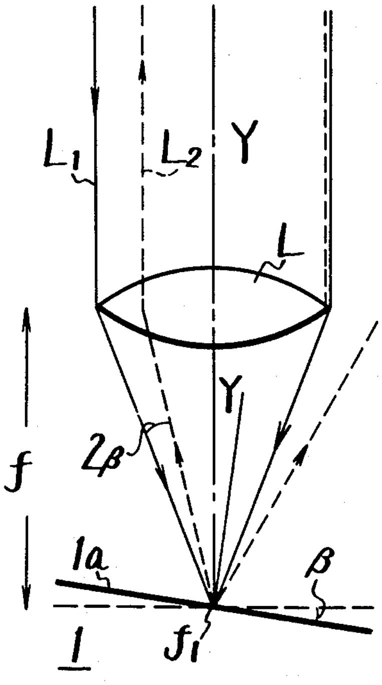

A description will be now given for the case where the mirror surface 1a of the disc 1 is not perpendicular to the incident light $L_1$ as shown in FIG. 6A. In such a case, if an angle $\beta$ of the light axis Y—Y of the incident light $L_1$ to the normal to the mirror surface 1a is within $\pm 1/1000$ radian (in the case of using a disc with 200$\phi$, if the rotation speed of the disc is 1/10 with the normal speed and there appears a fluctuation of $\pm 10$ microns, the maximum inclination angle is 1/1000 radian), the reflected light $L_2$ on the mirror surface 1a is incident over the lens group L with the inclination angle of $2\beta$ as shown in FIG. 6B. The reflected light $L_2$ on the mirror surface $1a$ is made parallel to the incident light $L_1$ by the lens group L, but a part of the reflected light on the mirror surface $1a$ will not be incident over the entire surface of the lens group L as shown in FIG. 6B. Accordingly, the light axis of the reflected light $L_2$ after passing through the lens group L is shifted from the axis Y—Y of the incident light $L_1$. In this case, if the focal length $f$ of the lens group L is taken as 3mm ($f$= 3mm), the displacement of the light axis of the reflected light from that of the incident light is $f \times 2\beta = 3 \times 2/1000$ mm = 6 microns. Thus, if the width or diameter of the slits or apertures 8 of the photo-sensors $A_1$ and $A_2$ is selected sufficiently greater than 6 microns, for example, 10 to 100 microns, the operation of this invention described above can be effected sufficiently because the reflected light having the displaced axis can, nevertheless, pass through the slits.

Another embodiment of this invention will be now described with reference to FIG. 5 in which the same reference numerals and letters as those used in FIG. 4 represent the same elements. In the embodiment shown in FIG. 5, in stead of the beam splitters BS2, a beam splitters BSO is disposed in the light path between the light modulating device S and the mirror M to partially reflect the light which is reflected thereon by the mirror M. The reflected light by the beam splitter BSO is further partially reflected by the beam splitter BS1. The light reflected by the beam spritter BS1 is received by the photo-sensor $A_1$ through the slit 8, while the light which passes through the beam splitter BS1 is received by the photo-sensor $A_2$ through the slit 8, respectively. In this case, it may be preferred that distances $d_1$ and $d_2$ between the beam splitter BS1 and the photo-sensor $A_1$ and between the beam splitter BS1 and the photo-sensor $A_2$ are selected as $d_1 < d_2$.

Figure 5:
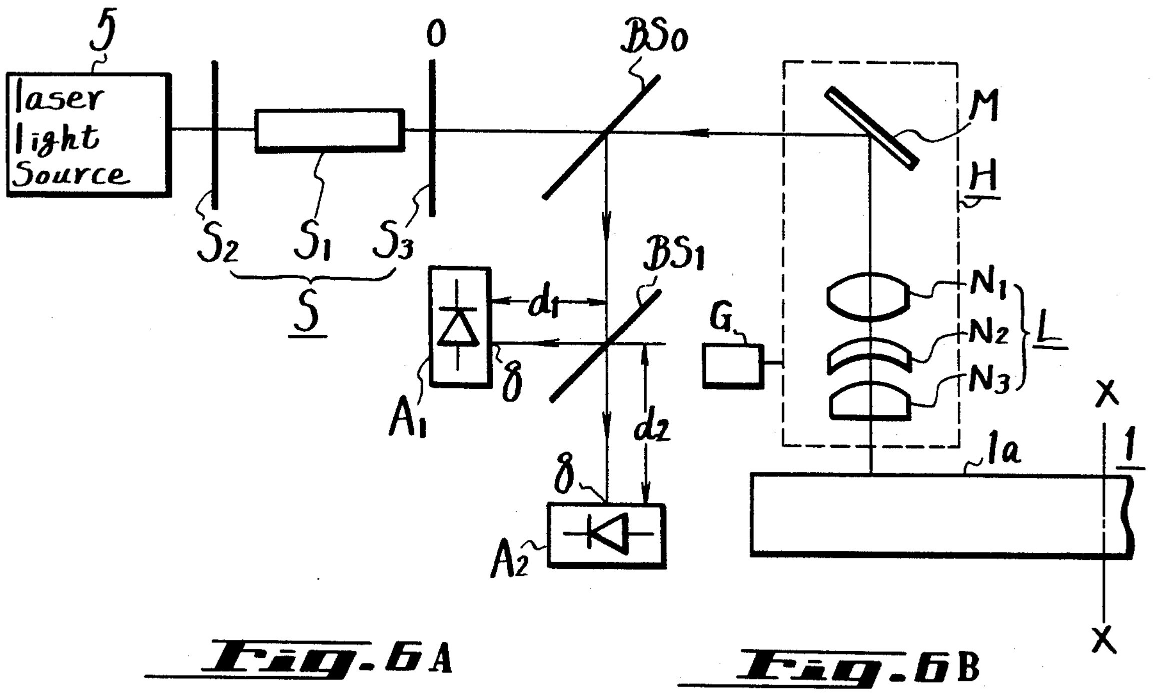
FIG. 5 is a schematic plane diagram showing another embodiment of the present invention.

With the embodiment shown in FIG. 5, the operation performed and effects obtained are the same as those of the first embodiment, but in addition thereto, due to the fact that the incident light over the mirror M passes through the single beam splitter BSO only, the energy loss of the light is reduced.

The above described and illustrated embodiments are only certain preferred ones of this invention. Accordingly, it may be apparent that many variations and modifications could be effected by those skilled in the art without departing from the spirit and scope of the novel concepts of the invention.

We claim as our invention:

1. Automatic focusing apparatus for use in apparatus for recording and/or reproducing information signals having a record medium with a mirror surface; a source of light and a lens assembly optically positioned in the light path extending between the light source and the record medium to focus a beam of light emitted from said light source onto said mirror surface whereby the focused beam is used to record information on the record medium and/or reproduce information from the record medium, comprising: a first beam splitter optically positioned in said light path for transmitting light from said light source toward said lens assembly, for transmitting a portion of light reflected from said mirror surface and received from said lens assembly, and for reflecting a portion of said light reflected from said mirror surface; a second beam splitter optically positioned in said light path and spaced from said first beam splitter for transmitting said light from said light source toward said lens assembly, for receiving said portion of light transmitted by said first beam splitter, and for reflecting a portion of said light received from said first beam splitter; first photosensing means optically coupled to said first beam splitter for receiving said portion of light reflected by said first beam splitter to produce a first signal proportional to the intensity of light received thereby; second photosensing means optically coupled to said second beam splitter for receiving said portion of light reflected by said second beam splitter to produce a second signal proportional to the intensity of light received thereby; first and second slit means positioned in light intercepting relation with respect to said first and second photosensing means, respectively, each of said slit means having an aperture in the range of 6 to 100 microns through which light is transmitted to said photosensing means; and lens control means mechanically coupled to at least one element of said lens assembly and responsive to the difference between said first and second signals for moving said at least one element to thereby maintain the point of focus of said beam of light on said mirror surface notwithstanding fluctuations in the spacing between said lens assembly and said mirror surface.

2. Automatic focusing apparatus for use in apparatus for recording and/or reproducing information signals having a record medium with a mirror surface; a source of light and a lens assembly optically positioned in the light path extending between the light source and the record medium to focus a beam of light emitted from said light source onto said mirror surface whereby the focused beam is used to record information on the record medium and/or reproduce information from the record medium, comprising: a first beam splitter optically positioned in said light path for transmitting light from said light source toward said lens assembly, and for reflecting a portion of the light which is reflected thereto from said mirror surface and received from said lens assembly; a second beam splitter optically coupled to said first beam splitter for receiving said portion of said light reflected by said first beam splitter and to transmit a portion of said received light and to reflect a portion of said received light; first photosensing means optically coupled to said second beam splitter for receiving said portion of light transmitted by said second beam splitter to produce a first signal proportional to the intensity of light received thereby; second photosensing means optically coupled to said second beam splitter and spaced therefrom by a distance which differs from the spacing between said second beam splitter and said first photosensing means for receiving said portion of light reflected by said second beam splitter to produce a second signal proportional to the intensity of light received thereby; first and second slit means positioned in light intercepting relation with respect to said first and second photosensing means, respectively, each of said slit means having an aperture in the range of 6 to 100 microns through which light is transmitted to said photosensing means; and lens control means mechanically coupled to at least one element of said lens assembly and responsive to the difference between said first and second signals for moving said at least one element to thereby maintain the point of focus of said beam of light on said mirror surface notwithstanding fluctuations in the spacing between said lens assembly and said mirror surface.

* * * * *